US008310730B2

(12) United States Patent
Lee

(10) Patent No.: US 8,310,730 B2
(45) Date of Patent: Nov. 13, 2012

(54) CONTROL DEVICE FOR CONTROLLING FAX-DATA, FAX SERVER, AND FAX SYSTEM AND METHOD THEREOF

(76) Inventor: Yun Kyu Lee, Seongnam-si (KR)

( * ) Notice: Subject to any disclaimer, the term of this patent is extended or adjusted under 35 U.S.C. 154(b) by 729 days.

(21) Appl. No.: 12/307,432

(22) PCT Filed: Jun. 26, 2007

(86) PCT No.: PCT/KR2007/003081
§ 371 (c)(1),
(2), (4) Date: Sep. 15, 2009

(87) PCT Pub. No.: WO2008/007864
PCT Pub. Date: Jan. 17, 2008

(65) Prior Publication Data
US 2009/0323100 A1   Dec. 31, 2009

(30) Foreign Application Priority Data
Jul. 13, 2006   (KR) .................. 10-2006-0065804

(51) Int. Cl.
*H04N 1/00* (2006.01)
(52) U.S. Cl. ........ 358/407; 358/400; 358/403; 358/435; 379/100.02; 379/100.06; 379/100.09; 379/100.12; 379/100.15
(58) Field of Classification Search ............... 358/1.1, 358/1.15, 407, 435, 440, 400, 403; 379/100.06, 379/100.12
See application file for complete search history.

(56) References Cited

U.S. PATENT DOCUMENTS

| 6,594,351 | B1 | 7/2003 | Bhogal et al. |
| 7,570,396 | B2 * | 8/2009 | Murakami ................... 358/407 |
| RE42,995 | E * | 12/2011 | Joffe et al. .................... 358/407 |
| 2004/0190053 | A1 * | 9/2004 | Okada et al. ................. 358/1.15 |
| 2005/0190403 | A1 * | 9/2005 | Nakamura ................... 358/1.15 |
| 2005/0264831 | A1 | 12/2005 | Sayama |
| 2005/0270558 | A1 * | 12/2005 | Konsella et al. ............. 358/1.15 |
| 2007/0002389 | A1 * | 1/2007 | Suehiro ........................ 358/401 |

FOREIGN PATENT DOCUMENTS

| CN | 1674622 | 9/2005 |
| EP | 1 569 434 A2 | 8/2005 |
| JP | 09-093289 | 9/1995 |
| JP | 10-178511 | 12/1996 |
| JP | 2002-237849 | 2/2001 |
| JP | 2002-290657 | 3/2001 |
| JP | 2004-297744 | 3/2003 |
| JP | 2005-223655 | 2/2004 |

OTHER PUBLICATIONS

EP 07 74 7103 srch report, Yun Kyu Lee.

\* cited by examiner

*Primary Examiner* — Benny Q Tieu
*Assistant Examiner* — Juan Guillermety
(74) *Attorney, Agent, or Firm* — Todd L. Juneau

(57) ABSTRACT

Provided are a fax data transmission controller, a fax server, a fax system, and a method of providing the fax system. The fax data transmission controller can store fax data received via a public switched telephone network (PSTN), and transmit the stored fax data to a fax server, to a facsimile, or to a user computer. The fax server can filter fax data that is received or to be transmitted, and perform authentication on the content of the fax data.

12 Claims, 3 Drawing Sheets

CONTROL DEVICE FOR CONTROLLING FAX-DATA, FAX SERVER, AND FAX SYSTEM AND METHOD THEREOF

TECHNICAL FIELD

The present invention relates to a fax system, and more particularly, to an apparatus for controlling transmission of fax data and a fax system including a fax server. Generally, a facsimile is connected to a public switched telephone network (PSTN) and can transmit and receive fax data to and from other facsimiles connected to the PSTN and output the received fax data.

BACKGROUND ART

Facsimiles may receive unnecessary data such as advertisements, because then are connected to a PSTN and thus anybody can transmit fax data to the facsimiles if they know the fax numbers of the facsimiles. Additionally, although the importance of information in a modern society increases, the security of data that are transmitted and received via facsimiles is weak. Accordingly, there remains a demand for a technique capable of reinforcing the security of fax data by filtering a calling number and/or a destination number during transception of data via facsimiles and by allowing fax data to undergo an authentication procedure while the fax data is being transmitted.

Moreover, although the use and importance of an existing PSTN decrease due to developments in Internet technology and mobile communications, the usability of facsimiles is still very high. In particular, facsimiles serve as a very important office machine in offices. However, in a recent communications system where Internet or Intranet is well established and each personal computer is connected to the Internet or Intranet, inclusion of a facsimile by each person is inefficient in terms of costs and resource applications and does not satisfy fax data security suitable for this system and efficient facsimile use.

Therefore, a fax system is desperately required, which can satisfy the demands of a plurality of users connected to the Internet and an efficient combination of an Internet or Intranet network with a PSTN for fax data transmission that are connected to each other via a computer, and can provide various fax-data security functions and a fax data filtering apparatus.

DETAILED DESCRIPTION OF THE INVENTION

Technical Problem

The present invention provides a fax data transmission controller which has a significantly reduced size and can simply perform an existing facsimile function by replacing existing large-sized and expensive facsimiles in Internet- or Intranet-established environments, and can transmit received fax data to a fax server or transmit the received fax data directly to a user computer, or transmit the received fax data to existing facsimiles, and a fax data transmission controlling method performed by the fax data transmission controller.

The present invention also provides a fax sender which can receive fax data from the fax data transmission controller and transmit the received fax data to user computers that are determined on the basis of a calling number included in the received fax data to be destinations approved to receive the fax data, and a fax data transmission controlling method performed by the fax sender.

The present invention also provides a fax server which can receive fax data requested by a user computer and transmit the received fax data if the content of the received fax data is to previously approved by an approver, but cannot transmit the received fax data if the fax number of the user computer is a predetermined fax number, and a fax data transmission controlling method performed by the fax server.

Advantageous Effects

A fax data transmission controller according to the present invention has a significantly reduced size and can simply perform existing facsimile functions by replacing existing large and expensive facsimiles in Internet- or Intranet-established environments, and can utilize existing facsimiles. Additionally, the fax data transmission controller according to the present invention can transmit received fax data to a fax server or transmit the received fax data directly to a user computer, or transmit the received fax data to existing facsimiles.

A fax server according to the present invention can receive fax data from the fax data transmission controller and transmit the received fax data to user computers that are determined on the basis of a calling number included in the received fax data to be destinations approved to receive the fax data, and a fax data transmission controlling method performed by the fax server. Additionally, the fax server according to the present invention can receive fax data requested by a user computer and transmit the received fax data if the content of the received fax data is previously approved by an approver, but cannot transmit the received fax data if the fax number of the user computer is a predetermined fax number, and a fax data transmission controlling method performed by the fax server.

Moreover, the fax server instead of facsimiles can control all of the fax data that is received or transmitted, and thus the utilization and inspection of various fax data are possible.

DESCRIPTION OF THE DRAWINGS

The above and other features and advantages of the present invention will become more apparent by describing in detail exemplar embodiments thereof with reference to the attached drawings in which.

BEST MODE

Figure 1:
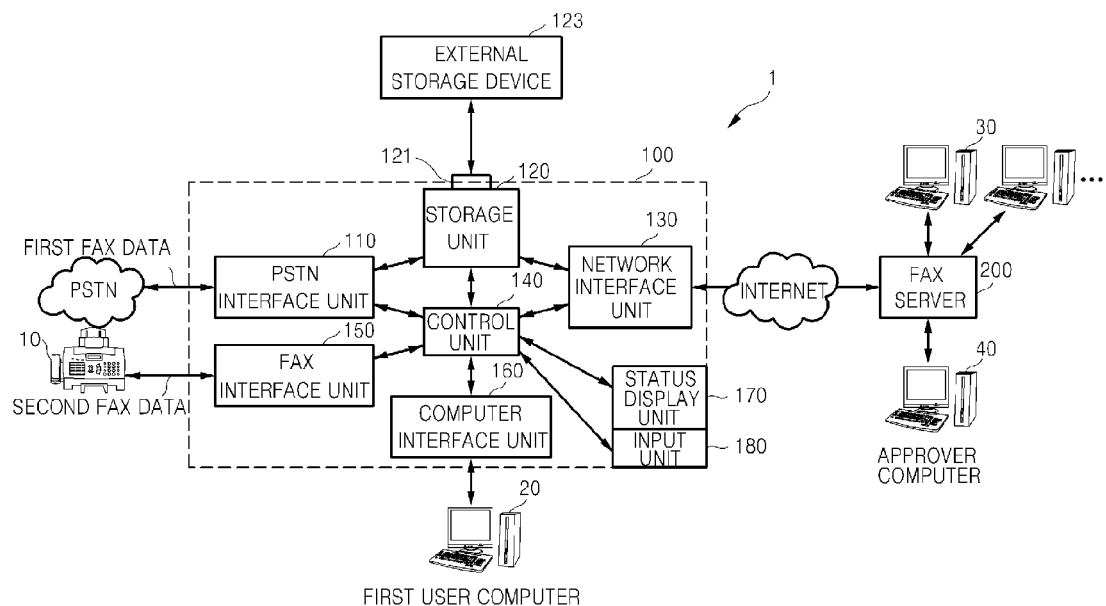
FIG. 1 is a block diagram of a fax system according to an embodiment of the present invention, particularly, illustrates a fax data transmitter of the fax system.

According to an aspect of the present invention, there is provided a fax data transmission controller including a public switched telephone network (PSTN) interface unit for receiving first fax data from an external source via a PSTN, a storage device for storing the first fax data received from the PSTN interface unit, a network interface unit for transmitting the first fax data received from the storage device to a fax server via an Internet, and a control unit for controlling fax data transmissions performed by the PSTN interface unit, the storage device, and the network interface unit.

The fax data transmission controller may further include a fax interface unit for receiving second fax data from a facsimile under the control of the control unit. The storage device may store the second fax data received from the fax interface unit. The network interface unit may transmit the second fax data received from the storage device to the fax sever via the Internet. The control unit may control the storage device to transmit the stored second fax data to the PSTN via the PSTN interface unit in response to a transmission approval signal received from the fax server via the network interface unit.

The fax data transmission controller may include a computer interface unit for transmitting the first fax data stored in the storage device to a first user computer.

The fax data transmission controller man further include a connection unit for connecting an external storage device to the fax data transmission controller. The fax data transmission controller may further include a status display unit which receives a status display signal from the control unit and displays an operational status of the central facsimile.

The fax data transmission controller may further include an input unit which receives data for use in configuration of the fax data transmission controller from an external source and outputs the received data to the control unit.

The PSTN interface unit may, include first DB-9 port for connecting the PSTN to the fax data transmission controller, and first capture block for capturing the first fax data that is input and output via the first DB-9 port.

The fax interface unit may include second DB-9 port for connecting the facsimile to the fax data transmission controller, and second capture block for capturing the second fax data that is input and output via the second DB-9 port.

The computer interface unit may include RS232 port for connecting the first user computer to the fax data transmission controller, and third capture block for capturing fax data that is input and output via the RS232 port.

The network interface unit may include an RJ-45 port for connecting the Internet to the fax data transmission controller, and an Ethernet controller for transmitting the first fax data to the fax sender via the RJ-45 port.

According to another aspect of the present invention, there is provided a fax server including a transmission/reception module for transmitting and receiving first fax data to and from an external source via an Internet, a storage module for storing the first fax data from the transmission/reception module, and a filtering module for receiving the first fax data from the storage module and outputting one of a reception refusal signal and a reception approval signal both for the first fax data to the storage module on the basis of a caller number included in the first fax data, wherein when the storage module has received the reception approval signal for the first fax data, the storage module transmits the first fax data received via the transmission/reception module to a second user computer in response to a fax request signal output from the second user computer.

The fax server may further include an authentication module which receives second fax data from the second user computer to be output to the outside and transmits the second fax data to an approver computer and the storage module in order to authenticate the content of the received second fax data. The authentication module may receive an authentication signal from the approver computer and transmit the authentication signal to the storage module. The filtering module may receive the second fax data from the storage module and output one of a send refusal signal and a send approval signal both for the second fax data to the storage module on the basis of a destination number included in the received second fax data. When the storage module has received the authentication signal and the send approval signal both for the second fax data, the storage module may transmit the stored second fax data to the outside via the Internet.

The filtering module may include a fax number storage unit which stores reception-refused fax numbers or reception-approved fax numbers in order to output one of the reception refusal signal and the reception approval signal. The fax number storage unit may receive the reception-refused fax numbers or reception-approved fax numbers from approver computer.

According to another aspect of the present invention, there is provided a fax system including a transmission/reception module for receiving first fax data from a fax data transmission controller via an Internet, a storage module for storing the first fax data output by the transmission/reception module, and a filtering module for receiving the first fax data from the storage module and outputting one of a reception refusal signal and a reception approval signal both for the first fax data to the storage module on the basis of a calling number included in the first fax data, wherein when the storage module has received the reception approval signal for the first fax data, the storage module transmits the stored first fax data to the second user computer via the transmission/reception module in response to a fax request signal output from the second user computer.

The fax data transmission controller may include a PSTN interface unit for receiving the first fax data from an external source via the PSTN, a storage device for storing the first fax data received from the PSTN interface unit, a network interface unit for transmitting the first fax data received from the storage device to the transmission/reception module via the Internet, and a control unit for controlling fax data transmissions performed by the PSTN interface unit, the storage device, and the network interface unit.

The fax data transmission controller may further include a fax interface unit for receiving second fax data from a facsimile. The storage device may store the second fax data from the fax interface unit. The network interface unit may transmit the second fax data received from the storage device to the transmission/reception module via the Internet. The storage module may store the second fax data received from the transmission/reception module. The filtering module mats receive the second fax data from the storage module and output one of a send refusal signal and a send approval signal both for the second fax data to the storage module on the basis of a destination number included in the second fax data. When the storage module has received the send approval signal for the second fax data, the storage module may transmit a transmission approval signal to the network interface unit via the transmission/reception module. The control unit may control the storage device to transmit the stored second fax data to the PSTN via the PSTN interface unit in response to the transmission approval signal received from the storage module via the network interface unit.

The fax system may further include an authentication module which receives the second fax data output from the storage module and transmits the second fax data to approver computer in order to perform authentication on the content of the received second fax data. The authentication module mast receive an authentication signal from the approver computer and transmit the authentication signal to the storage module. When the storage module has received the send approval signal and the authentication signal both for the second fax data, the storage module may transmit the transmission approval signal to the network interface unit via the transmission/reception module.

The fax system may further include an authentication module which receives third fax data from the second user computer to be output to the outside and transmits the third fax data to an approver computer and the storage module in order to authenticate the content of the received third fax data. The authentication module may receive an authentication signal from the approver computer and transmit the authentication signal to the storage module. The filtering module may receive the third fax data from the storage module and output one of a send refusal signal and a send approval signal both for the third fax data to the storage module on the basis of a destination number included in the received third fax data. When the storage module has received the authentication signal and the send approval signal both for the third fax data, the storage module may transmit the stored third fax data to the network interface unit via the transmission/reception module. The control unit may transmit the third fax data received from the storage module via the network interface unit to the PSTN via the PSTN interface unit.

The fax data transmission controller may further include a computer interface unit for transmitting fourth fax data from a first user computer. The storage device may store the fourth fax data output from the computer interface unit. The network interface unit may transmit the fourth fax data received from the storage device to the transmission/reception module via the Internet. The storage module mall store the fourth fax data received from the transmission/reception module. The filtering module may receive the fourth fax data from the storage module and output a send refusal signal or a send approval signal both for the fourth fax data to the storage module on the basis of a destination number included in the received fourth fax data. When the storage module has received the send approval signal both for the fourth fax data the storage module may transmit a transmission approval signal to the network interface unit via the transmission/reception module. The control unit may control the storage device to transmit the stored fourth fax data to the PSTN via the PSTN interface unit in response to the transmission approval signal received from the storage module via the network interface unit.

According to another aspect of the present invention, there is provided a method of providing a fax system, the method including the operations of a fax data transmission controller receiving reception fax data from an external source via a PSTN, the fax data transmission controller storing the received reception fax data, and the fax data transmission controller transmitting the stored reception fax data to a fax server via an Internet.

The method of providing the fax system may further include the operation of the fax data transmission controller transmitting the stored first fax data to a first user computer.

The method of providing the fax system may further include the operations of the fax server receiving the reception fax data from the fax data transmission controller, the fax server storing the reception fax data, the fax server determining on the basis of a caller number included in the stored reception fax data whether the reception fax data is refused or allowed to be received, and the fax server transmitting the reception fax data to a second user computer in response to a fax request signal output from the second user computer when the reception fax data is allowed to be received.

According to another aspect of the present invention there is provided a method of providing a fax system, the method including the operations of a fax data transmission controller receiving transmission fax data from a facsimile, the fax data transmission controller storing the received transmission fax data, the fax data transmission controller transmitting the stored transmission fax data to a fax server via an Internet, the fax data transmission controller receiving a transmission approval signal for the transmission fax data from the fax server, and the fax data transmission controller transmitting the stored transmission fax data to an external source via a PSTN in response to the received transmission approval signal.

The operation of receiving the transmission approval signal from the fax server using the fax data transmission controller include the sub-operations of the fax server storing the received transmission fax data, the fax server determining on the basis of a destination number included in the stored transmission fax data whether the transmission fax data is refused or allowed to be sent, and the fax server transmitting the transmission approval signal to the fax data transmission controller when it is determined that the transmission fax data is allowed to be sent.

The operation of receiving the transmission approval signal from the fax server using the fax data transmission controller may further include the sub-operations of the fax server transmitting the transmission fax data to an approver computer in order to perform authentication on the content of the stored transmission fax data, and the fax server receiving an authentication signal from the approver computer. When the content of the transmission fax data is authenticated and the transmission fax data is allowed to be sent, the fax server may transmit the transmission approval signal to the fax data transmission controller.

According to another aspect of the present invention, there is provided a method of providing a fax system, the method including the operations of a fax data transmission controller receiving transmission fax data from a first user computer, the fax data transmission controller storing the received transmission fax data, the fax data transmission controller transmitting the stored transmission fax data to a fax server via an Internet, the fax data transmission controller receiving a transmission approval signal for the transmission fax data from the fax server, and the fax data transmission controller transmitting the stored transmission fax data to an external source via a PSTN in response to the received transmission approval signal.

According to another aspect of the present invention, there is provided a method of providing a fax system, the method including the operations of a fax server receiving reception fax data from an external source, the fax server storing the received reception fax data, the fax server determining on the basis of a caller number included in the stored reception fax data whether the reception fax data is refused or allowed to be received, and the fax server transmitting the reception fax data to a second user computer in response to a fax request signal output from the second user computer when the reception fax data is allowed to be received.

According to another aspect of the present invention, there is provided a method of providing a fax system, the method including the operations of a fax server receiving transmission fax data to be transmitted to the outside from a second user computer, the fax server storing the received transmission fax data, the fax server transmitting the transmission fax data to an approver computer in order to perform authentication on the content of the stored transmission fax data, the fax server receives an authentication signal from the approver computer, and the fax sender transmits the transmission fax data to a fax data transmission controller via an Internet when the content of the transmission fax data is authenticated.

The method of providing the fax system may further include the operation of the fax server determining on the basis of a destination number included in the stored transmission fax data whether the transmission fax data is refused or allowed to be sent. The fax server may transmit the transmission fax data to the fax data transmission controller via the Internet when the content of the transmission fax data is authenticated and the transmission fax data is allowed to be sent.

The method of providing the fax system may further include the operation of transmitting the transmission fax data received from the fax server to the outside via a PSTN using the fax data transmission controller.

MODE OF THE INVENTION

FIG. 1 is a block diagram of a fax system according to an embodiment of the present invention, particularly, illustrates a fax data transmitter of the fax system.

Referring to FIG. 1, a fax data transmission controller 100 of the fax data transmitter includes a public switched telephone network (PSTN) interface unit 110 a storage device 120, a network interface unit 130, and a control unit 140.

The fax data transmission controller 100 may further include a fax interface unit 150, a computer interface unit 160, a status display unit 170, or an input unit 180. Preferably, the PSTN interface unit 110, the storage device 120, and the network interface unit 130 operate under the control of the control unit 140. However, a description of the operations of the PSTN interface unit 110, the storage device 120, and the network interface unit 130 under the control of the control unit 140 will be omitted for convenience of explanation.

The PSTN interface unit 110 receives first fax data from an external source via a PSTN. The PSTN interface unit 110 may output fax data that is to be transmitted to the outside via the PSTN.

The storage device 120 stores the first fax data received from the PSTN interface unit 110. Examples of the storage device 110 may include volatile memory, non-volatile memory, and a storage medium such as a hard disc or an optical data storage medium. However, the present invention is not limited to these examples. By storing fax data received via the PSTN or the Internet in the storage device 120, retransmission of the fax data is possible when a situation, such as generation of an error to a network, occurs or when a facsimile which has to receive fax data is in connection With other PSTN line, and a manager is able to check all of the fax data that has been transmitted or received.

The network interface unit 130 transmits the first fax data received from the storage device 120 to a fax server 200 via the Internet. The network interface unit 130 cannot only transmit fax data via the Internet but also via other wired/wireless communications networks such as Intranet. However, for convenience of explanation, transmission of fax data via the Internet will be illustrated, but the present invention is not limited thereto. The network interface unit 130 may receive fax data from an external source via the Internet so that the fax data transmission controller 100 can receive the fax data.

The control unit 140 controls the transmissions of fax data by the PSTN interface unit 110, the storage device 120, and the network interface unit 130. In order to control the transmissions of fax data by the PSTN interface unit 110, the storage device 120, and the network interface unit 130, the control unit 140 may include a processor such as a CPU or a micro controller unit (MCU). Moreover, the control unit 140 may include memory (not shown) for storing firmware for use in driving or controlling the PSTN interface unit 110, the storage device 120, and the network interface unit 130.

The fax data transmission controller 100 may further include a fax interface unit 150 for receiving second fax data (i.e., fax data that a facsimile wants to transmit to the outside) from a facsimile 10 under the control of the control unit 140. In other words, the fax data transmission controller 100 may be connected to the facsimile 10 in order to utilize existing facsimiles. Accordingly, external fax data may be transmitted to the facsimile 10 via the fax data transmission controller 100. In addition, even when the facsimile 10 desires to transmit fax data to the outside, the fax data may be transmitted to the outside via the fax data transmission controller 100.

The storage device 120 stores the second fax data output by the fax interface unit 150. The network interface unit 130 transmits the second fax data received from the storage device 120 to the fax server 200 via the Internet.

The control unit 140 controls the second fax data stored in the storage device 120 to be transmitted to the PSTN via the PSTN interface unit 110, in response to a transmission approval signal received from the fax server 200 via the network interface unit 130. In other words, the second fax data cannot be transmitted to the outside until the fax data transmission controller 100 receives the transmission approval signal, representing an approval of transmission of the second fax data to the outside, from the fax server 200. The transmission approval signal to be output from the fax server 200 may undergo a filtering or authenticating process which is to be described later. However, the present invention is not limited to this process, and thus the transmission approval signal may undergo the other various security inspections in the fax server 200.

The fax data transmission controller 100 may further include a computer interface unit 160 for transmitting the first fax data stored in the storage device 120 to a first user computer 20. Additionally, the computer interface unit 160 may receive fax data to be transmitted to the outside from the first user computer 20. in other words, the first fax data that the fax data transmission controller 100 has received from an external source may be transmitted to the fax server 200, but the first fax data may also be directly transmitted to the first user computer 20 connected to the fax data transmission controller 100. Thus, even when only the fax data transmission controller 100 and a computer exist in a fax system, transception of fax data is possible without including a separate existing facsimile. When a user wants to output fax data, the fax data can be print out using a printer (not shown) connected to the first user computer 20.

The fax data transmission controller 100 may further include a connection unit for connecting an external storage device 123 to the fax data transmission controller 100. In other words, when the storage device 120 included in the fax data transmission controller 100 is full of fax data and thus the storage device 120 is short of capacity, the external storage device 123 can be used. The connecting unit may be a USB port, a serial port, or the like, but the present invention is not limited thereto.

The fax data transmission controller 100 may further include a status display unit 170 which receives a status display signal from the control unit 140 and displaces an operational status of the fax data transmission controller 100. In other words, the status display unit 170 may include a lamp (not shown) that allows a user to check an operational status of the fax data transmission controller 100, such as a reception or transmission of fax data by the fax data transmission controller 100 or generation of an error.

The fax data transmission controller 100 may further include an input unit 180 for receiving data for use in configuring the fax data transmission controller 100 from an external source and outputting the received data to the control unit 140. In other words, when a user wants to delete or update fax data stored in the storage device 120 or upgrade for example the firmware stored in the control unit 140, the user can input a command for deleting or updating the fax data or input firmware, for example, via the input unit 180. The input unit 180 may be connected to an interface device (not shown) through which a user inputs a command or controls an operation of the control unit 140.

Figure 2:
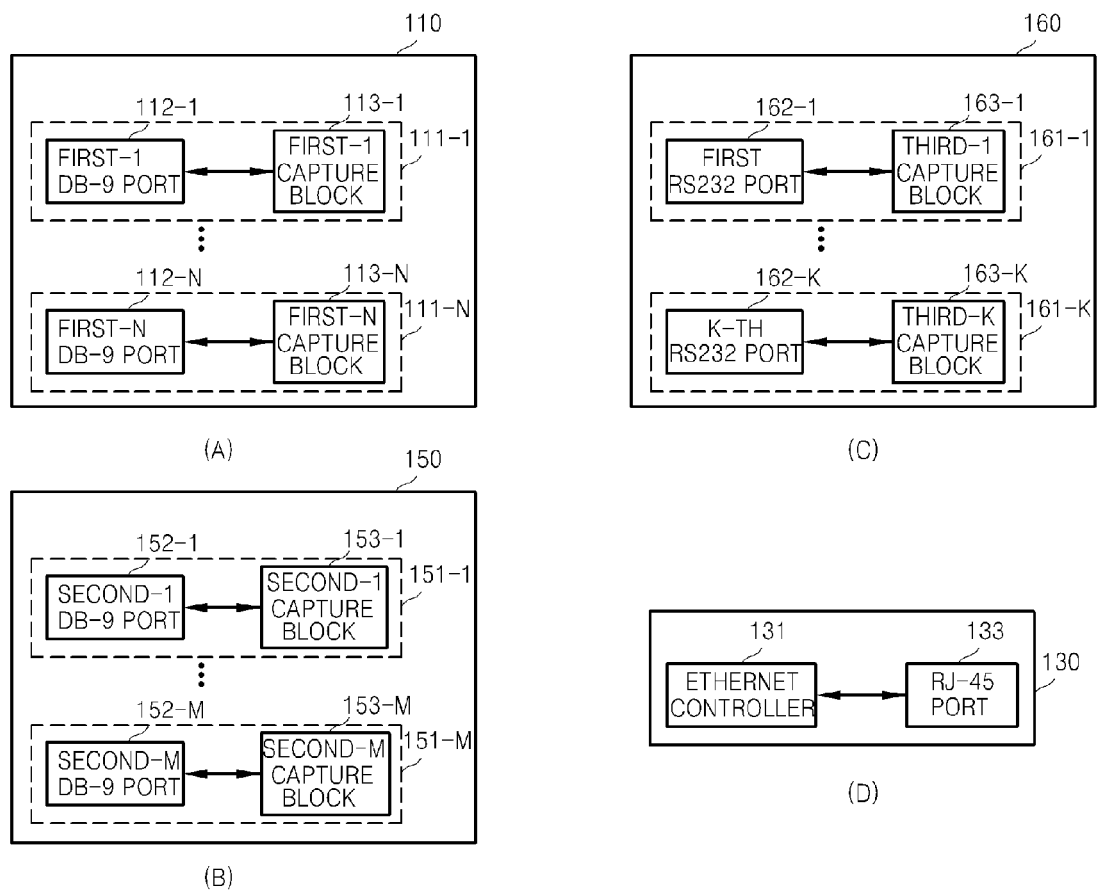
FIG. 2 illustrates structures of interface units of the fax data transmitter illustrated in FIG. 1.

FIG. 2 illustrates structures of the interface units 110, 130, 150, and 160 of the fax data transmitter illustrated in FIG. 1. Referring to FIGS. 1 and 2, the PSTN interface unit 110 may include first DB-9 ports 112-1 through 112-N for connecting the PSTN with the fax data transmission controller 100, and first capture blocks 111-1 through 111-N for capturing the first fax data that is input and output via the first DB-9 ports 112-1 through 112-N. In other words, the PSTN interface unit 110 may include a port for connecting at least one PSTN with the fax data transmission controller 100. In other words, even when a user uses a plurality of fax numbers, all of the fax data to be transmitted to the fax numbers can be controlled by only the fax data transmission controller 100. The first DB-9 ports 112-1 through 112-N may be phone connection ports for connecting the fax data transmission controller 100 with the PSTN, and the first capture blocks 113-1 through 113-N may capture fax data which is input and output in an image file format (e.g., TIF). The first capture blocks 113-1 through 113-N may be configured using a conventional fax chip.

The fax interface unit 150 may include second DB-9 ports 152-1 through 152-M for connecting the facsimile 10 with the fax data transmission controller 100, and second capture blocks 153-1 through 153-M for capturing the second fax data that is input and output via the second DB-9 ports 152-1 through 152-M. In other words, the fax interface unit 150 may, include a port for connecting at least one facsimile with the fax data transmission controller 100.

In other words, when a plurality of facsimiles are included, the fax data transmission controller 100 may be connected to each of the facsimiles in order to use all of the plurality of facsimiles, and the fax data transmission controller 100 may control fax data that is to be input and output to and from the facsimiles. The second DB-9 ports 152-1 through 152-N may be phone connection ports for connecting the fax data transmission controller 100 with the facsimile 10, and the second capture blocks 153-1 through 153-N may capture fax data that is input and output in an image file format (e.g., TIF). The second capture blocks 153-1 through 153-N may be configured using a conventional fax chip.

The computer interface unit 160 may include RS232 ports 162-1 through 162-K for connecting the first user computer 20 with the fax data transmission controller 100, and third capture blocks 163-1 through 163-K for capturing fax data that is input and output via the RS232 ports 162-1 through 162-K. In other words, the computer interface unit 160 may include a port for connecting at least one user computer with the fax data transmission controller 100.

In other words, when a plurality of user computers are included, the fax data transmission controller 100 may be connected to each of the user computers so that the user computers receive or send fax data, and the fax data transmission controller 100 may control fax data that is input and output from the user computers. The RS232 ports 162-1 through 162-N may be serial ports for connecting the fax data transmission controller 100 with the first user computer 20, and the third capture blocks 163-1 through 163-N may capture fax data that is input and output in an image file format (e.g., TIF). The third capture blocks 163-1 through 163-N may be configured using a conventional fax chip.

The network interface unit 130 malt include an RJ45 port 133 for connecting the Internet with the fax data transmission controller 100, and an Ethernet controller 131 for transmitting the first fax data to the fax server via the RJ45 port 133. In other words, the fax data transmission controller 100 may have an IP address so as to be connected to the Internet and so that another system (for example, the fax server) makes a request for a connection to the fax data transmission controller 100 or receives the request from the fax data transmission controller 100. In order to be connected to the Internet with the IP address and input and output fax data via the Internet, the fax data transmission controller 100 may include the Ethernet controller 131. The RJ-45 port 133 may be a LAN port.

Figure 3:
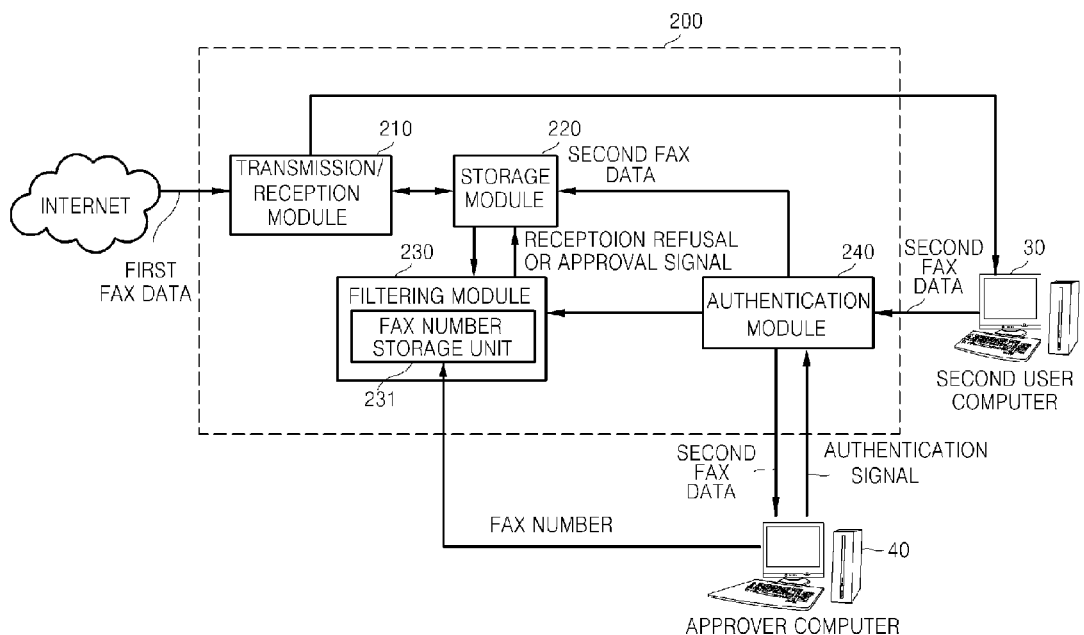
FIG. 3 is a block diagram of a fax server of the fax data transmitter illustrated in FIG. 1.

FIG. 3 is a block diagram of the fax server 200 of the fax data transmitter illustrated in FIG. 1. Referring to FIG. 3, the fax server 200 includes a transmission/reception module 210, a storage module 220, and a filtering module 230. The fax server 200 may further include an authentication module 240. The fax server 200 may also further include a control module (not shown) or processor (not shown) for controlling the transmission/reception module 210, the storage module 220, and the filtering module 230.

However, for convenience of explanation, a description of operations of the transmission/reception module 210, the storage module 220, and the filtering module 230 under the control of the control module or processor will be omitted herein. The transmission/reception module 210 transceives first fax data that is received from an external source via the Internet.

The storage module 220 stores the first fax data received from the transmission/reception module 210. Examples of the storage module 220 may include a hard disc drive, a magnetic disc drive, an optical disc drive, etc. Alternatively, the storage module 220 may be implemented as a Bernoulli cartridge, a random access memory (RAM), a read-only memory (ROM) or the like, but the present invention is not limited to these examples. The storage module 220 may store the received first fax data as it is received.

Alternatively, the storage module 220 may separate a destination number or a calling number from the first fax data and store the destination or calling number together with the first fax data. The first fax data may be stored in database which is implemented for several security inspections or filtering inspections that are to be described later. The database may be implemented as a single table or several separate table. The database can also be implemented as other various forms, such as a linked-list, a tree, a relational DB, etc.

The filtering module 230 receives the first fax data from the storage module 220 and outputs a reception refusal signal or a reception approval signal for the first fax data to the storage module 220 on the basis of a caller number included in the received first fax data. If the storage module 220 has stored the destination number or calling number together with the first fax data after separating it from the first fax data, the filtering module 230 may receive only the calling number from the storage module 220. When the filtering module 230 outputs the reception refusal signal or the reception approval signal to the storage module 220, the storage module 220 may further store a filtering tag corresponding to the first fax data stored in the storage module 220, which represents a reception refusal or a reception approval.

When the storage module 220 has received the reception approval signal for the first fax data, the storage module 220 transmits the stored first fax data to a second user computer 30 via the transmission/reception module 210 in response to a fax request signal output from the second user computer 30.

In other words, when the fax request signal is output from the second user computer 30 to the fax server 200, the fax server 200 searches for the filtering tag corresponding to the first fax data Only when the filtering tag represents a reception approval, the fax server 200 can allow to the storage module 220 to transmit the first fax data to the second user computer 30. Thus, unnecessary or undesirable fax data is blocked in advance, and thus a user can receive only necessary or desirable fax data.

The fax server 200 man further include an authentication module 240 which receives second fax data to be transmitted to the outside from the second user computer 30 and transmits the second fax data to an approver computer 40 and the storage module 220 in order to authenticate the content of the received second fax data.

In other words, the authentication module 240 inspects the content of the second fax data that the second user computer 30 wants to transmit to the outside. Although it is illustrated in the present embodiment that the content of the second fax data is authenticated using the approver computer 40, the present invention is not limited thereto. For example, the authentication module 240 may scan or recognize the content of the second fax data in order to authenticate the second fax data and may refuse an authentication of the second fax data if the scanned or recognized fax data content includes pre-set data.

The authentication module 240 receives an authentication signal from the approver computer 40 and transmits the authentication signal to the storage module 220. When the authentication module 240 outputs the authentication signal or a non-authentication signal to the storage module 220, the storage module 220 may further store an authentication tag corresponding to the second fax data stored in the storage module 220, which represents authentication or non-authentication.

The filtering module 230 receives the second fax data from the storage module 220 and outputs a send refusal signal or a send approval signal for the second fax data to the storage module 220 on the basis of a destination number included in the second fax data. When the filtering module 230 outputs the send refusal signal or the send approval signal both for the second fax data to the storage module 220, the storage module 220 may further store a filtering tag corresponding to the second fax data stored in the storage module 220, which represents a send refusal or a send approval.

When the storage module 220 has received the authentication signal and the send approval signal both for the second fax data, the storage module 220 may transmit the stored second fax data to the outside via the Internet. In other words, when a second user desires to transmit fax data to the outside, the second user can transmit the fax data to the outside only when both the fax data and a destination, that is, the outside, are authenticated. However, the second user can transmit the fax data to the outside even when only one of the fax data and the destination, that is, the outside, is authenticated.

In order to output the reception refusal signal or the reception approval signal, the filtering module 230 may include a fax number storage unit 231 for storing reception-refused fax numbers or reception-allowed fax numbers. The fax number storage unit 231 may also store send-refused fax numbers or send-allowed fax numbers, and various fax numbers such as frequently used fax numbers according to user' needs.

The fax number storage unit 231 may receive the reception-refused fax numbers or reception-allowed fax numbers from the approver computer 40. In other words, it is preferable that fax numbers for security such as numbers for filtering fax numbers are set to be able to be input only by a manager (for example, an approver). However, for example, fax numbers (for example, frequently used fax numbers) other than the fax numbers for security may be input or deleted by other common users via the fax number storage unit 231. In other words, the fax number storage unit 231 can identify fax numbers that can be controlled according to the grades of connected users.

Moreover, the fax server 200 may perform not only the above-described filtering or the above-described fax data authentication but also other various functions, because the fax server 200 is able to control fax data by using the fax data transmission controller 100 in contrast with a conventional art where a facsimile controls fax data. For example, when a short message service (SMS) center is connected to the fax server 200 and the fax server 200 receives fax data from an external source that is to be transmitted to a person A, the fax server 200 may search for a pre-stored telephone number of the mobile phone of the person A and inform the mobile phone of the person A of an arrival or non-arrival of the fax data through an SMS. Alternatively, the person A may be informed of an arrival or non-arrival of the fax data through an E-mail.

Figure 4:
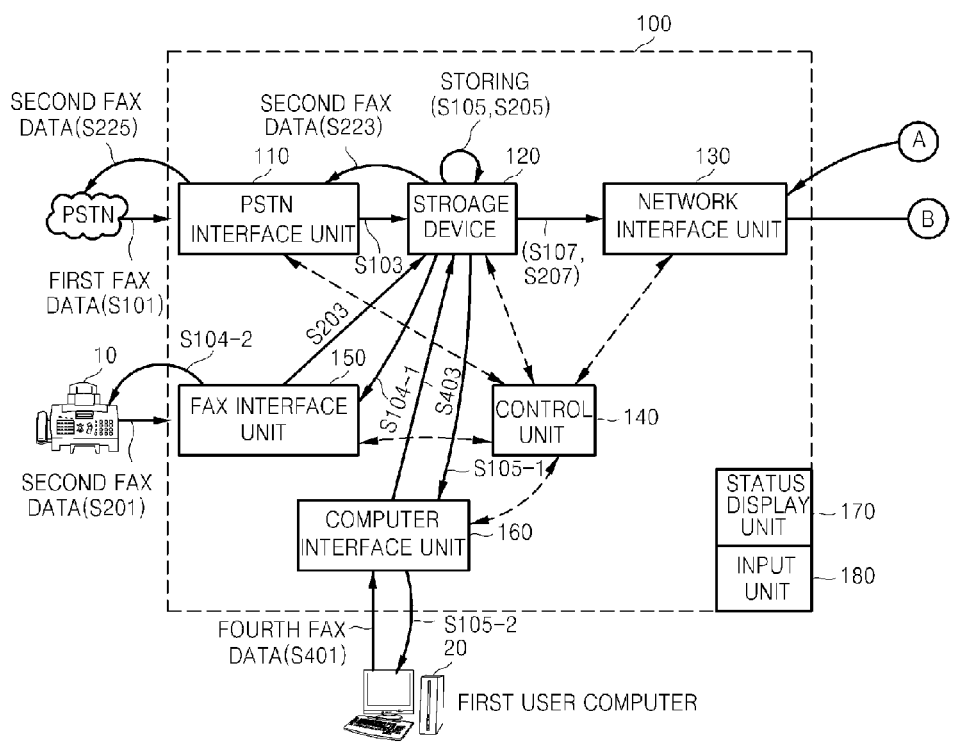
FIGS. 4 and 5 are block diagrams and data flowcharts of a fax system according to an embodiment of the present invention.
Figure 5:
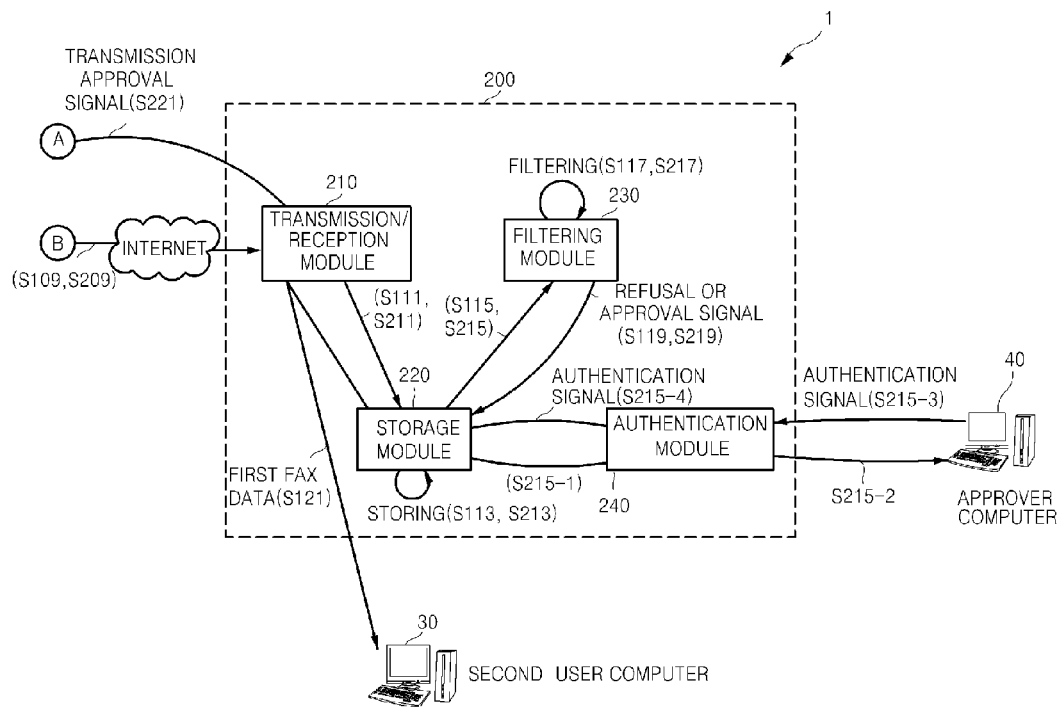

FIGS. 4 and 5 are block diagrams and data flowcharts of a fax system 1 according to an embodiment of the present invention. Referring to FIGS. 4 and 5, the fax system 1 includes a fax data transmission controller 100 and a fax server 200. In operation S108, a transmission/reception module 210 receives first fax data from the fax data transmission controller 100 via the Internet. In operations S111 and S113, a storage module 230 receives the first fax data from the transmission/reception module 210 and stores the first fax data therein.

In operation S115, a filtering module 220 receives the first fax data from the storage module 230. in operations S117 and S119, the filtering module 220 outputs a reception refusal signal or a reception approval signal for the first fax data to the storage module 220 on the basis of a caller number included in the received first fax data.

In operation S121, when the storage module 230 has received the reception approval signal for the first fax data, the storage module 230 transmits the stored first fax data to a second user computer 30 via the transmission/reception module 210 in response to a fax request signal output from the second user computer 30.

The fax data transmission controller 100 includes a PSTN interface unit 110, a storage device 120, a network interface unit 130, and a control unit 140. The fax data transmission controller 100 may further include a fax interface unit 150, a computer interface unit 160, a status display unit 170, or an input unit 180.

In operation S101 the PSTN interface unit 110 receives the first fax data from an external source via a PSTN. In operation S105, the storage device 120 stores the first fax data that is output by the PSTN interface unit 110 in operation S103. In operation S109, the network interface unit 130 transmits the first fax data output from the storage device 120 in operation S107 to the transmission/reception module 210 via the Internet. The control unit 140 controls fax data transmissions that are performed by the PSTN interface unit, the storage device, and the network interface unit.

The fax data transmission controller 100 malt transmit the First fax data received from the external source via the PSTN directly to a facsimile 10 or a first user computer 20 without transmitting the first fax data to the fax sender 200.

More specifically, in operation S101, the PSTN interface unit 110 may receive the first fax data from the external source via the PSTN. In operation S105, the storage device 120 may store the first fax data that has been received from the PSTN interface unit 110 in operation S103. In operation S104-1 or S105-1, the fax interface unit 150 or the computer interface unit 160 may receive the first fax data from the storage device 120, respectively. The fax interface unit 150 or the computer interface unit 160 may output the received first fax data to the facsimile 10 or the first user computer 20, respectively.

In operation S201, the fax interface unit 150 of the fax data transmission controller 100 receives second fax data from the facsimile 10.

In operation S205, the storage device 120 stores the second fax data output from the fax interface unit 150 in operation S203. In operation S209, the network interface unit 150 transmits the second fax data received from the storage device 120 in operation S207 to the transmission/reception module 210 via the Internet. In operation S213, the storage module 220 stores the second fax data received from the transmission/reception module 210 in operation S211.

In operation S215, the filtering module 230 receives the second fax data from the storage module 220. In operations S217 and S219, the filtering module 230 outputs a send refusal signal or a send approval signal both for the second fax data to the storage module 220 on the basis of a destination number included in the received second fax data In operation S221, when the storage module 220 has received the send approval signal for the second fax data from the filtering module 230, the storage module 220 transmits a transmission approval signal to the network interface unit 130 via the transmission/reception module 210. In operations S223 and S225, the control unit 140 controls the storage device 120 to transmit the second fax data stored therein to the PSTN via the PSTN interface unit 110 in response to the transmission approval signal received from the storage module 220 via the network interface unit 130.

The fax server 200 may further include an authentication module 240 which receives the second fax data from the storage module 220 in operation S215-1 and transmits the received second fax data to an approver computer 40 in operation S215-2 in order to perform authentication on the content of the received second fax data.

The authentication module 240 receives an authentication signal from the approver computer 40 in operation S215-3 and transmits the authentication signal to the storage module in operation S215-4. When the storage module 220 receives the send approval signal and the authentication signal both for the second fax data, the storage module 220 can transmit the transmission approval signal to the network interface unit 130 via the transmission/reception module 210.

The fax data transmission controller 100 may further include the computer interface unit 160 for receiving fourth fax data from the first user computer 20 in operation S401. The storage device 120 stores the fourth fax data output from the computer interface unit 160 in operation S403. A process of outputting the fourth fax data to the outside via the PSTN by using the fax data transmission controller 100 and the fax server 200 may be the same as the above-described process of outputting the second fax data, so a detailed description thereof will be omitted.

Figure 6:
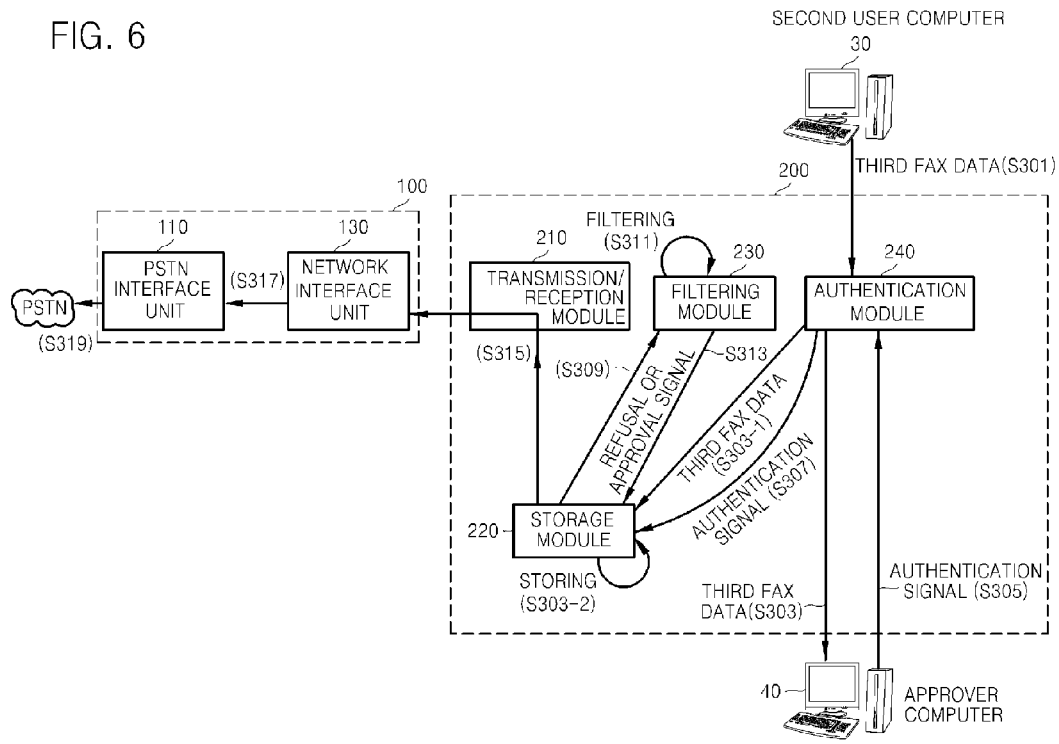
FIG. 6 is a block diagram and a data flowchart of a fax system according to another embodiment of the present invention.

FIG. 6 is a block diagram and a data flowchart of the fax system illustrated in FIGS. 4 and 5, according to another embodiment of the present invention. Referring to FIGS. 4, 5, and 6, the authentication module 240 receives third fax data from the second user computer 30 in operation S301, and transmits the third fax data to the approver computer 40 and the storage module 220 in operations S303 and S303-1, respectively, in order to perform authentication on the content of the received third fax data.

The authentication module 240 receives an authentication signal from the approver computer 40 in operation S305 and transmits the authentication signal to the storage module 220 in operation S307. The filtering module 230 receives the third fax data from the storage module 220 in operation S309 and outputs a send refusal signal or a send approval signal both for the third fax data to the storage module 220 on the basis of a destination number included in the received third fax data in operations S311 and S313.

In operation S315, when the storage module 220 receives the authentication signal and the send approval signal both for the third fax data, the storage module 220 transmits the stored third fax data to the network interface unit 130 via the transmission/reception module 210. In operations S317 and S319, the control unit 140 controls the third fax data received from the storage module 220 via the network interface unit 130 to be transmitted to the PSTN via the PSTN interface unit 110.

While the present invention has been particularly shown and described with reference to exemplar) embodiments thereof, it will be understood by those of ordinary skill in the art that various changes in form and details may be made therein without departing from the spirit and scope of the present invention as defined by the following claims.

INDUSTRIAL APPLICABILITY

A fax system according to the present invention is applicable to Internet- or Intranet-established environments in order to replace existing facsimiles or perform a fax function.

The invention claimed is:

1. A fax data transmission controller comprising:
a public switched telephone network (PSTN) interface unit receiving first fax data from an external source via a PSTN;
a storage device storing the first fax data received from the PSTN interface unit;
a network interface unit transmitting the first fax data received from the storage device to a fax server via the Internet;
a control unit controlling fax data transmissions performed by the PSTN interface unit, the storage device, and the network interface unit;
a fax interface unit for receiving second fax data from a facsimile under the control of the control unit;
wherein the storage device is configured to store the second fax data received from the fax interface unit;
the network interface unit is configured to transmit the second fax data received from the storage device to the fax server via the Internet; and
the control unit is configured to control the storage device to transmit the stored second fax data to the PSTN via the PSTN interface unit in response to a transmission approval signal received from the fax server via the network interface unit.

2. The fax data transmission controller of claim 1, further comprising a computer interface unit transmitting the first fax data stored in the storage device to a first user computer; and
a status display unit which receives a status display signal from the control unit and displays an operational status of the fax data transmission controller.

3. The fax data transmission controller of claim 1, further comprising a connection unit connecting an external storage device to the fax data transmission controller; and
    an input unit which receives data for use in configuration of the fax data transmission controller from an external source and outputs the received data to the control unit.

4. A fax server comprising:
    a transmission/reception module transmitting and receiving first fax data to and from an external source via the Internet;
    a storage module storing the first fax data from the transmission/reception module;
    a filtering module receiving the first fax data from the storage module and outputting one of a reception refusal signal and a reception approval signal both for the first fax data to the storage module on the basis of a caller number included in the first fax data;
    an authentication module receiving second fax data from second user computer to be output to the outside and transmitting the second fax data to an approver computer and the storage module in order to authenticate the content of the received second fax data;
    wherein when the storage module has received the reception approval signal for the first fax data, the storage module transmits the first fax data received via the transmission/reception module to the second user computer in response to a fax request signal output from the second user computer;
    the authentication module is configured to receive an authentication signal from the approver computer and transmits the authentication signal to the storage module;
    the filtering module is configured to receive the second fax data from the storage module and outputs one of a send refusal signal and a send approval signal both for the second fax data to the storage module on the basis of a destination number included in the received second fax data; and
    when the storage module has received the authentication signal and the send approval signal both for the second fax data, the storage module transmits the stored second fax data to the outside via the Internet.

5. The fax server of claim 4, wherein:
    the filtering module comprises a fax number storage unit which stores reception-refused fax numbers of reception-approved fax numbers in order to output one of the reception refusal signal and the reception approval signal; and
    the fax number storage unit receives the reception-refused fax numbers or reception-approved fax numbers from approver computer.

6. A method of providing a fax system, the method comprising:
    a fax data transmission controller receiving transmission fax data from a facsimile;
    the fax data transmission controller storing the received transmission fax data;
    the fax data transmission controller transmitting the stored transmission fax data to a fax server via the Internet;
    the fax data transmission controller receiving a transmission approval signal for the transmission of fax data from the fax server; and
    the fax data transmission controller transmitting the stored transmission fax data to an external source via a PSTN in response to the received transmission approval signal.

7. The method of claim 6, wherein:
    the receiving of the transmission approval signal from the fax server using the fax transmission data transmission controller further comprises;
    the fax server transmitting the transmission fax data to an approver computer in order to perform authentication on the content of the stored transmission fax data;
    the fax server receiving an authentication signal from the approver computer; and
    when the content of the transmission fax data is authenticated, the fax server transmits the transmission approval signal to the fax data transmission controller.

8. A recording medium having recorded thereon a program for the method of claim 6.

9. A method of providing a fax system, the method comprising:
    a fax data transmission controller receiving transmission fax data from a first user computer;
    the fax data transmission controller storing the received transmission fax data;
    the fax data transmission controller transmitting the stored transmission fax data to a fax server via the Internet;
    the fax data transmission controller receiving a transmission approval signal for the transmission fax data from the fax server; and
    the fax data transmission controller transmitting the stored transmission fax data to an external source via a PSTN in response to the received transmission approval signal.

10. A method of providing a fax system, the method comprising:
    a fax server receiving transmission fax data to be transmitted to the outside from a second user computer;
    the fax server storing the received transmission fax data;
    the fax server transmitting the transmission fax data to an approver computer in order to perform authentication on the content of the stored transmission fax data;
    the fax server receives an authentication signal from the approver computer; and
    the fax server transmits the transmission fax data to a fax data transmission controller via the Internet in response to the authentication signal.

11. The method of claim 10, further comprising the fax server determining on the basis of a destination number included in the stored transmission fax data whether the transmission fax data is refused or allowed to be sent,
    wherein the fax server transmits the transmission fax data to the fax data transmission controller via the Internet when the content of the transmission fax data is authenticated and the transmission fax data is allowed to be sent.

12. The method of claim 11, further comprising the fax data transmission controller transmitting the transmission fax data received from the fax server to the outside via a PSTN.

* * * * *